(12) United States Patent
Muraoka

(10) Patent No.: US 10,911,987 B2
(45) Date of Patent: Feb. 2, 2021

(54) RADIO BASE STATION AND METHOD OF ALLOCATING RADIO RESOURCES

(71) Applicant: NEC Corporation, Tokyo (JP)

(72) Inventor: Kazushi Muraoka, Tokyo (JP)

(73) Assignee: NEC CORPORATION, Tokyo (JP)

( * ) Notice: Subject to any disclaimer, the term of this patent is extended or adjusted under 35 U.S.C. 154(b) by 0 days.

(21) Appl. No.: 16/340,568

(22) PCT Filed: Oct. 3, 2017

(86) PCT No.: PCT/JP2017/035995
§ 371 (c)(1),
(2) Date: Apr. 9, 2019

(87) PCT Pub. No.: WO2018/079208
PCT Pub. Date: May 3, 2018

(65) Prior Publication Data
US 2020/0053598 A1    Feb. 13, 2020

Related U.S. Application Data

(60) Provisional application No. 62/412,961, filed on Oct. 26, 2016.

(51) Int. Cl.
*H04W 72/04* (2009.01)
*H04W 28/20* (2009.01)
(Continued)

(52) U.S. Cl.
CPC ........... *H04W 28/20* (2013.01); *H04L 1/0003* (2013.01); *H04W 4/70* (2018.02); *H04W 92/18* (2013.01)

(58) Field of Classification Search
CPC ...... H04L 1/0003; H04L 5/0037; H04W 4/70; H04W 4/90; H04W 28/16; H04W 28/18;
(Continued)

(56) References Cited

U.S. PATENT DOCUMENTS 8,761,099 B2 *  6/2014  Charbit ................. H04W 72/04
370/329
8,982,895 B2 *  3/2015  Bontu ................... H04L 1/1812
370/401
(Continued)

FOREIGN PATENT DOCUMENTS

WO     2014/167883 A1    10/2014

OTHER PUBLICATIONS

Lee et al, Resource Allocation Scheme for Device-to-Device Communication for Maximizing Spatial Reuse, IEEE, 6 pages, 2013.*
(Continued)

*Primary Examiner* — Frank Duong
(74) *Attorney, Agent, or Firm* — Sughrue Mion, PLLC

(57) ABSTRACT

A radio base station (1) determines allocated radio resources and a Modulation and Coding Scheme (MCS) for each of a plurality of bandwidth-guaranteed radio terminals in a manner such that an amount of radio resources to be allocated to each bandwidth-guaranteed radio terminal is increased and the MCS to be set for each bandwidth-guaranteed radio terminal is reduced as far as possible within a range that allows a transmission rate of each bandwidth-guaranteed radio terminal obtained after the radio resources are allocated to the plurality of bandwidth-guaranteed radio terminals to achieve a desired transmission rate. Accordingly, for example, it is possible to provide adaptive modulation and coding that allows a bandwidth-guaranteed user to achieve a desired transmission rate (or that makes it possible to increase a probability of achieving a desired transmission rate).

13 Claims, 9 Drawing Sheets

(51) Int. Cl.
*H04W 4/70* (2018.01)
*H04L 1/00* (2006.01)
*H04W 92/18* (2009.01)

(58) Field of Classification Search
CPC ... H04W 28/20; H04W 72/048; H04W 72/06;
H04W 72/087; H04W 72/10; H04W
74/002; H04W 76/02; H04W 88/02;
H04W 92/18
See application file for complete search history.

(56) References Cited

U.S. PATENT DOCUMENTS

| | | | |
|---|---|---|---|
| 9,398,601 B2* | 7/2016 | Na | H04W 72/121 |
| 9,420,564 B2* | 8/2016 | Charbit | H04W 72/04 |
| 2015/0230237 A1 | 8/2015 | Clevorn | |
| 2015/0334693 A1* | 11/2015 | Lu | H04W 72/0406 370/329 |

OTHER PUBLICATIONS

Sugahara et al, Feasibility of capacity enchancement of public safety LTE using device-to-device communication, IEEE, 6 pages, Oct. 2015.*

Muraoka et al, Scheduling for Device-to-Device Communication Considering Spatial Reuse and User Fairness in Public Safety LTE, IEEE, 5 pages, 2016.*

"Native sidelink support in flexible frame structure for NR", Nokia, Alcatel-Lucent Shanghai Bell, 3GPP TSG-RAN WG1#86, R1-167268, Aug. 22-26, 2016, 8 pages, Gothenburg, Sweden.

"Discussion on adaptation of MCS depending on UE speed", LG Electronics, 3GPP TSG RAN WG1 Meeting #85, R1-164509, May 23-27, 2016, pp. 1-3, Nanjing, China.

International Search Report for PCT/JP2017/035995 dated Jan. 9, 2018 (PCT/ISA/210).

* cited by examiner

|  | D2D PAIR #1 | D2D PAIR #2 | D2D PAIR #3 |
|---|---|---|---|
| RB COUNT | 4 | 10 | 5 |
| MCS | 20 | 20 | 20 |
| TOTAL BIT COUNT | 1736 | 4304 | 2152 |

| | D2D PAIR #1 | D2D PAIR #2 | D2D PAIR #3 |
|---|---|---|---|
| RB COUNT | 15 | 20 | 15 |
| MCS | 7 | 13 | 9 |
| TOTAL BIT COUNT | 1752 | 4512 | 2328 |

INCREASING RB COUNT AND LOWERING MCS, THEREBY ENABLING EQUIVALENT NUMBER OF BITS TO BE TRANSMITTED

RADIO BASE STATION AND METHOD OF ALLOCATING RADIO RESOURCES

CROSS REFERENCE TO RELATED APPLICATIONS

This application is a National Stage of International Application No. PCT/JP2017/035995 filed Oct. 3, 2017, claiming priority based on U.S. Provisional Patent Application No. 62/412,961 filed Oct. 26, 2016, the disclosure of which is incorporated herein in its entirety by reference.

TECHNICAL FIELD

The present disclosure relates to radio communication technology and, in particular, to allocation of radio resources to a plurality of radio terminals.

BACKGROUND ART

In commercial Long Term Evolution (LTE), scheduling is carried out under a policy that allows a high frequency-utilization efficiency to be obtained while ensuring fairness among users (e.g., proportional fairness scheduling). Meanwhile, in public safety LTE, since the importance of communication is high, it is important to satisfy a required condition (e.g., 1 Mbps). FIG. 1 illustrates an example of a scenario in which public safety LTE is used. Accordingly, it is preferable that bandwidth-guaranteed communication achieving a desired transmission rate on a user-by-user basis can be achieved for public safety LTE.

Hereinafter, device-to-device (D2D) communication in LTE will be described. An interface between terminals for D2D communication in LTE is referred to as a sidelink. D2D transmission (sidelink transmission) in LTE uses a frame structure identical to the LTE frame structure defined for uplink and downlink and uses a subset of uplink resources in frequency and time domains.

FIG. 2 illustrates how a base station allocates radio resources to D2D transmission terminals in respective D2D pairs. FIG. 3 illustrates an example of resources to be allocated for D2D transmission and remaining resources for uplink transmission within a D2D control period.

The base station schedules radio resources for D2D communication in the time and frequency directions every D2D control period (e.g., 40 ms). The D2D control period is also referred to as a sidelink control period or a PSCCH period. In 3GPP Release 12, the sidelink control period is 40 ms, 60 ms, 70 ms, 80 ms, 120 ms, 140 ms, 160 ms, 240 ms, 280 ms, or 320 ms. In other words, the sidelink control period includes 40 subframes, 60, subframes, 70 subframes, 80 subframes, 120 subframes, 140 subframes, 160 subframes, 240 subframes, 280 subframes, or 320 subframes.

In D2D communication, ACK/NACK feedback is not used. Used instead is a technique similar to Transmit Time Interval (TTI) bundling in which a transmission terminal repeatedly transmits a signal four times and a reception terminal combines these signals. Specifically, a D2D transmission terminal transmits the same transport block in four subframes (i.e., four TTIs) included in a subframe set used for data (Physical Sidelink Shared Channel (PSSCH)) transmission within a given D2D control period.

Next, adaptive modulation and coding used in uplink and downlink communication between a 3GPP LTE base station and a terminal (User Equipment (UE)) will be described. The base station determines a Modulation and Coding Scheme (MCS) in a manner such that a set value of a block error rate (BLER) becomes a predetermined value (e.g., 10%) depending on communication quality of the terminal (e.g., Signal to Noise Ratio (SNR) or Signal to Interference-pulse-Noise Ratio (SINR)). FIG. 4 shows an MCS table indicating a relationship between MCS indices and modulation orders. Each MCS index represents a combination of a modulation scheme and a coding rate. Transmission where an appropriate MCS is used can reduce a transmission error, and thus more bits can be transmitted per unit time. In other words, the adaptive modulation and coding can contribute to achieving a high frequency-utilization efficiency.

SUMMARY OF INVENTION

Technical Problem

Adaptive modulation and coding similar to that of the base station communication in 3GPP LTE (i.e., uplink communication and downlink communication) could possibly be applied to D2D communication as well. In the current 3GPP specifications, base stations cannot be aware of the communication quality of D2D communication. However, it is speculated that, with a progress in standardization in future, operations of a base stations and a terminal will be defined to allow a base station to be aware of and utilize the communication quality of D2D communication in the future 3GPP specifications. In this case, a set value of the BLER for adaptive modulation and coding in D2D communication will be different from that in uplink and downlink communication that uses retransmission based on ACK/NACK. Specifically, it is conceivable that the BLER set value to be used to determine the MCS needs to be smaller in D2D communication that does not use retransmission than in the base station communication (uplink and downlink communication) that uses retransmission.

However, when the BLER set value to be used to determine the MCS is too small (e.g., 0.1%), consumption of radio resources increases. This results in an increase in the possibility that other bandwidth-guaranteed users cannot achieve their desired transmission rates. In contrast, when the BLER set value to be used to determine the MCS is large (e.g., 1%), the possibility that a desired transmission rate of every user cannot be achieved increases.

Accordingly, one object to be achieved by embodiments disclosed herein is to provide adaptive modulation and coding that allows a bandwidth-guaranteed user to achieve a desired transmission rate (or that makes it possible to increase a probability of achieving a desired transmission rate). It is to be noted that this object is merely one of a plurality of objects to be achieved by a plurality of embodiments disclosed herein. Other objects or problems and novel features will become apparent from the descriptions in the present specification and the accompanying drawings.

Solution to Problem

In a first aspect, a radio base station includes a transceiver configured to communicate wirelessly with a plurality of radio terminals and a controller configured to allocate radio resources to the plurality of radio terminals. The controller is configured to determine allocated radio resources and a Modulation and Coding Scheme (MCS) for each of a plurality of bandwidth-guaranteed radio terminals in a manner such that an amount of radio resources to be allocated to each bandwidth-guaranteed radio terminal is increased and the MCS to be set for each bandwidth-guaranteed radio terminal is reduced as far as possible within a range that allows a transmission rate of each bandwidth-guaranteed radio terminal obtained after the radio resources are allocated to the plurality of bandwidth-guaranteed radio terminals to achieve a desired transmission rate.

In a second aspect, a method of allocating radio resources includes determining allocated radio resources and a Modulation and Coding Scheme (MCS) for each of a plurality of bandwidth-guaranteed radio terminals in a manner such that an amount of radio resources to be allocated to each bandwidth-guaranteed radio terminal is increased and the MCS to be set for each bandwidth-guaranteed radio terminal is reduced as far as possible within a range that allows a transmission rate of each bandwidth-guaranteed radio terminal obtained after the radio resources are allocated to the plurality of bandwidth-guaranteed radio terminals to achieve a desired transmission rate.

In a third aspect, a program includes a set of instructions (software codes) that, upon loaded into a computer, causes the computer to perform the method according to the above second aspect.

Advantageous Effects of Invention

According to the foregoing aspects, it is possible to provide adaptive modulation and coding that allows a bandwidth-guaranteed user to achieve a desired transmission rate (or that makes it possible to increase a probability of achieving a desired transmission rate).

DESCRIPTION OF EMBODIMENTS

Specific embodiments will be described hereinafter in detail with reference to the drawings. The same or corresponding elements are denoted by the same symbols throughout the drawings, and duplicated explanations are omitted as necessary for the sake of clarity.

Figure 5:
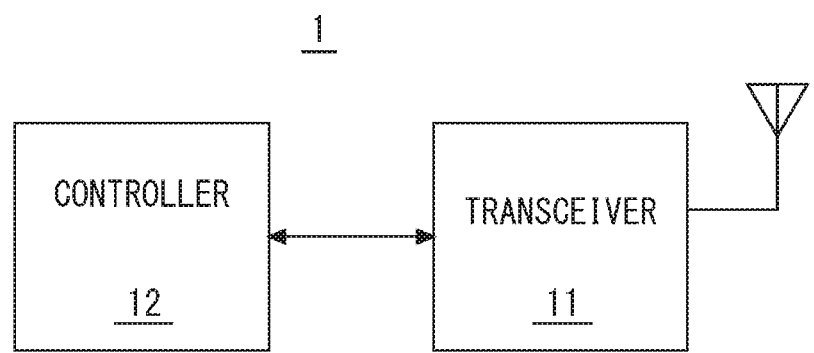
FIG. 5 is a block diagram illustrating a configuration example of a base station according to some embodiments.

FIG. 5 is a block diagram illustrating a configuration example of a base station 1 according to some embodiments. The base station 1 includes a radio transceiver 11 and a controller 12. The transceiver 11 is configured to communicate wirelessly with a plurality of radio terminals (UEs). The controller 12 is configured to allocate radio resources to the UEs. The controller 12 allocates radio resources to uplink (UL) transmission from each UE to the base station 1, to downlink (DL) transmission from the base station 1 to each UE, and to D2D transmission by D2D transmission terminals.

First Embodiment

In the first embodiment, the controller 12 of the base station 1 operates in a manner such that the amount of radio resources to be allocated to each terminal (each user) is increased and the MCS to be set for each terminal is reduced as far as possible, within a range that allows the transmission rate obtained after the resources are allocated to a plurality of bandwidth-guaranteed users to achieve a transmission rate no lower than a desired transmission rate.

Figure 1:
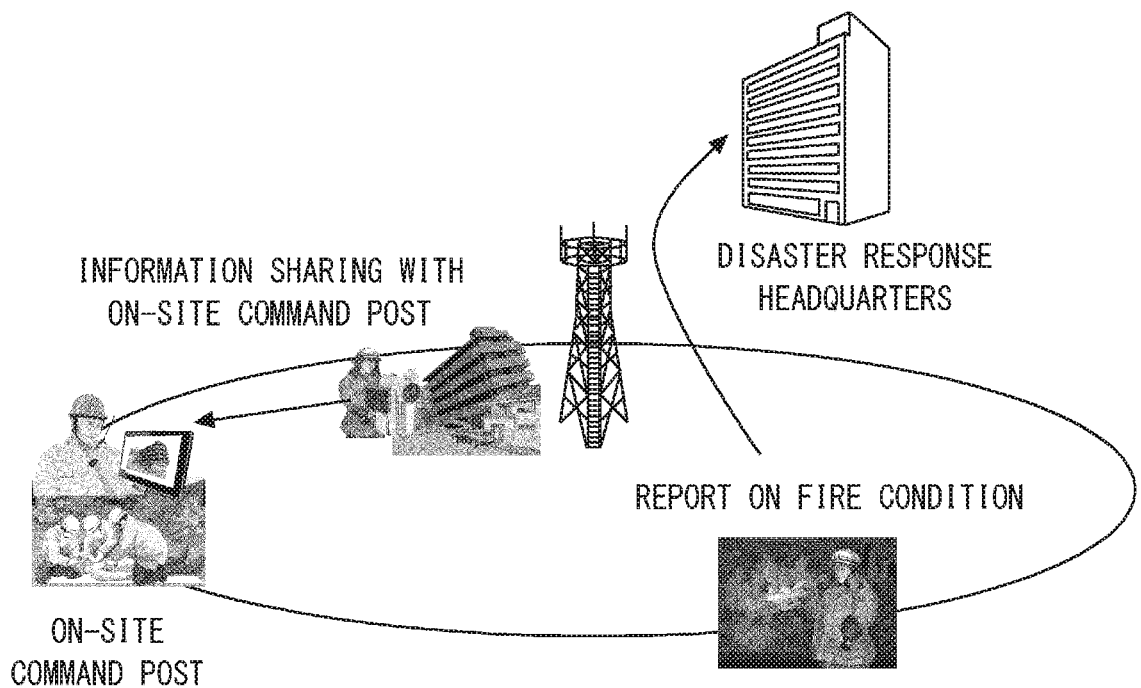
FIG. 1 illustrates an example of a scenario in which public safety LTE is used.
Figure 2:
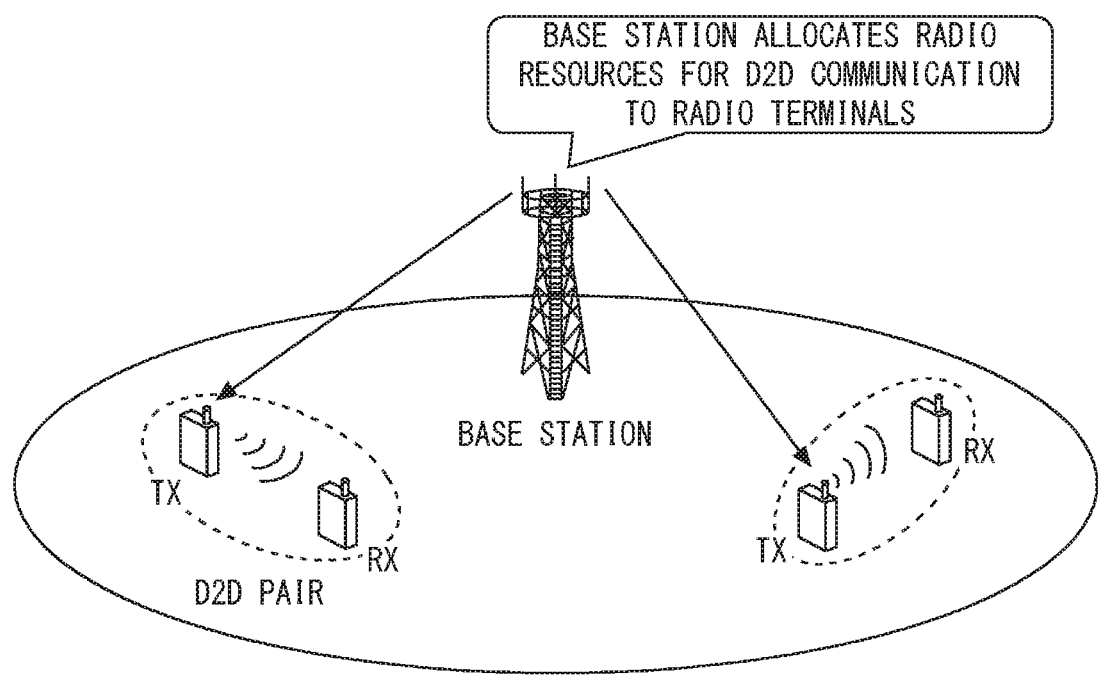
FIG. 2 illustrates how a base station allocates radio resources to D2D transmission terminals.
Figure 3:
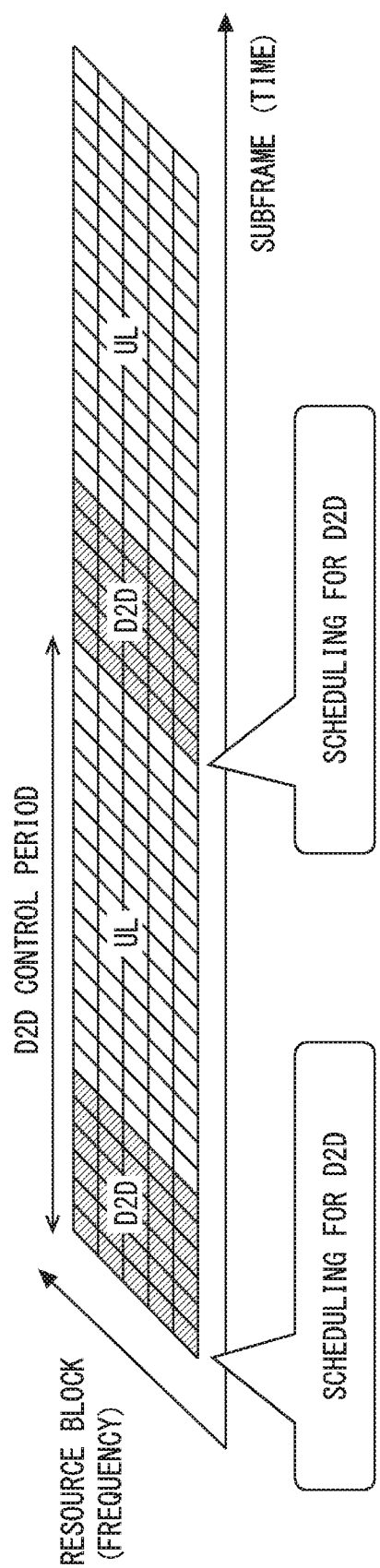
FIG. 3 illustrates an example of resources to be allocated for D2D transmission and remaining resources for uplink transmission within a D2D control period.
Figure 4:
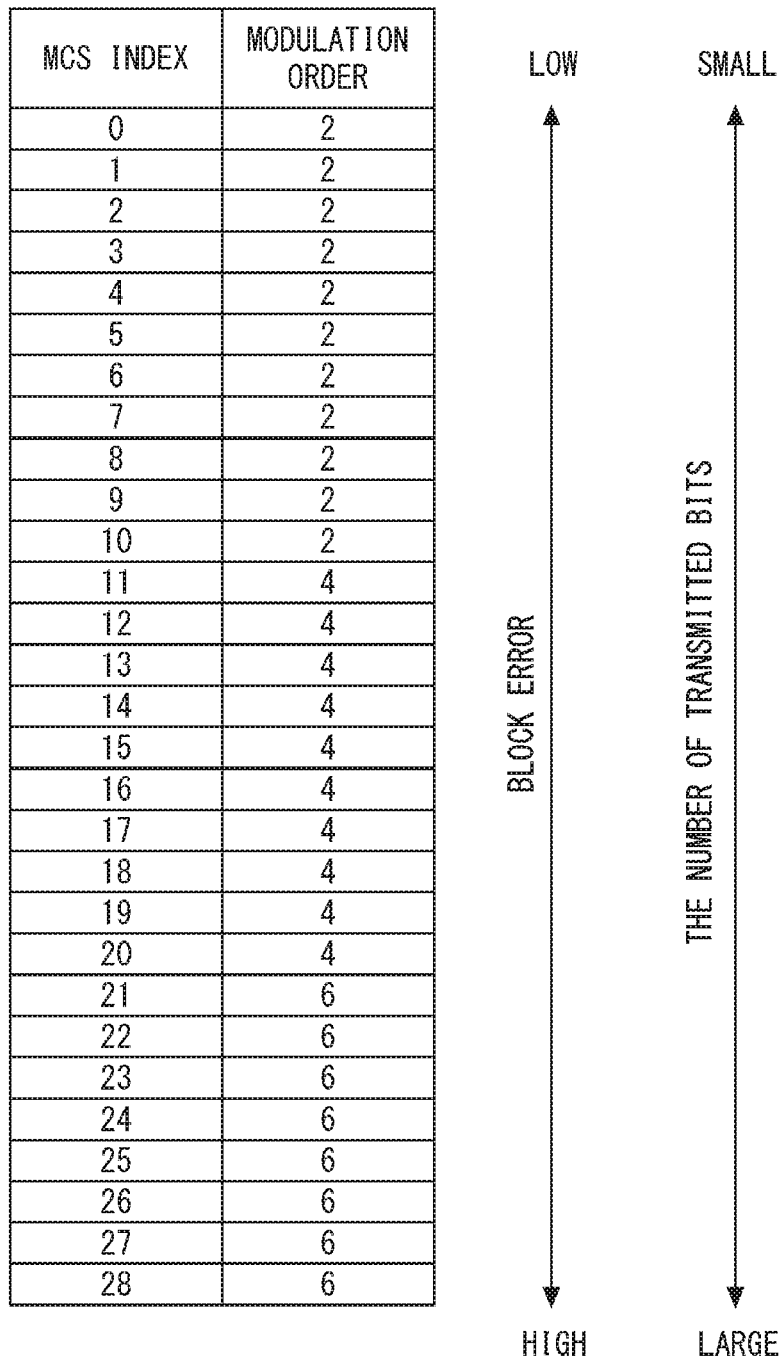
FIG. 4 illustrates an MCS table indicating a relationship between MCS indices and modulation orders.
Figures 6A, 6B:
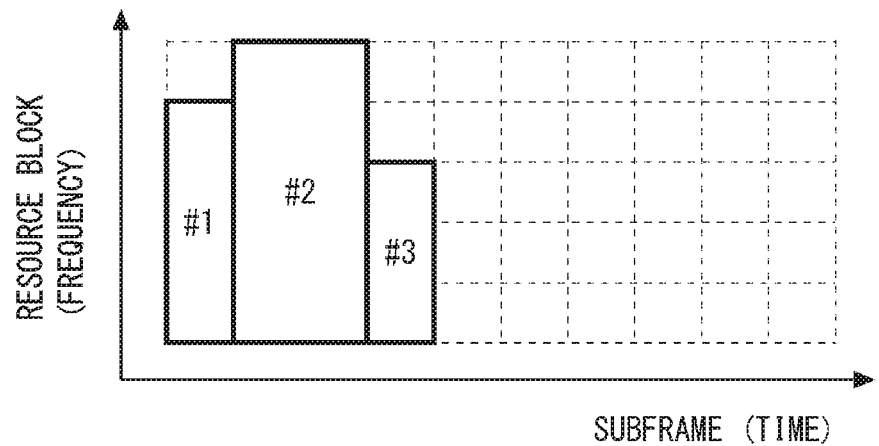
FIG. 6A illustrates an example of radio resources allocated to each of a plurality of D2D pairs.
FIG. 6B illustrates an example of an MCS and radio resources allocated to each of a plurality of D2D pairs.
Figures 7A, 7B:
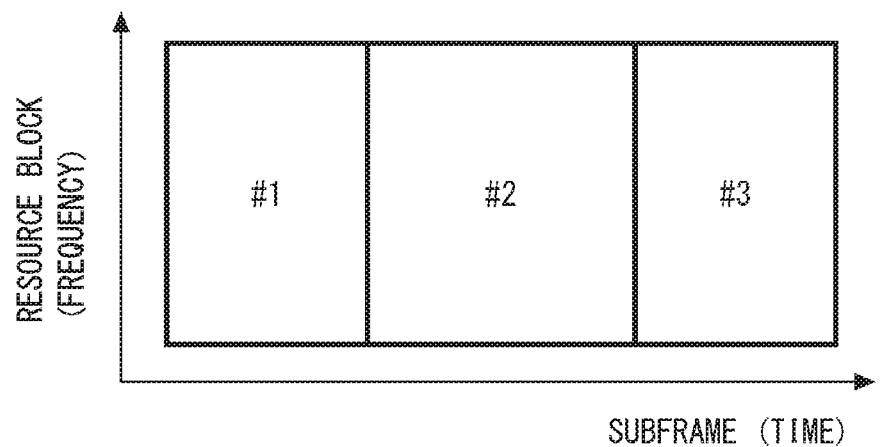
FIG. 7A illustrates an example of radio resources allocated to each of a plurality of D2D pairs.
FIG. 7B illustrates an example of an MCS and radio resources allocated to each of a plurality of D2D pairs.

For example, in the example illustrated in FIGS. 6A and 6B, 4 resource blocks (RBs) are allocated to the first D2D pair (#1), 10 RBs are allocated to the second D2D pair (#2), and 5 RBs are allocated to the third D2D pair (#3). The MCS indices of the first, second, and third D2D pairs are all 20. In contrast, in another example illustrated in FIGS. 7A and 7B, the controller 12 allocates unused resources (unused RBs) to the first, second, and third D2D pairs and reduces the MCS index of each D2D pair as much as possible under a condition that each D2D pair can transmit the bits in a number equivalent to that in the example illustrated in FIGS. 6A and 6B.

Allocating unallocated radio resources to the terminals (users) as much as possible makes it possible to obtain a desired transmission rate while using a lower MCS. Then, as the BLER decreases due to the lower MCS, the probability of actually obtaining a desired transmission rate can be increased. Accordingly, the probability that a plurality of bandwidth-guaranteed users can simultaneously achieve their desired transmission rates increases.

Second Embodiment

Figure 8A:
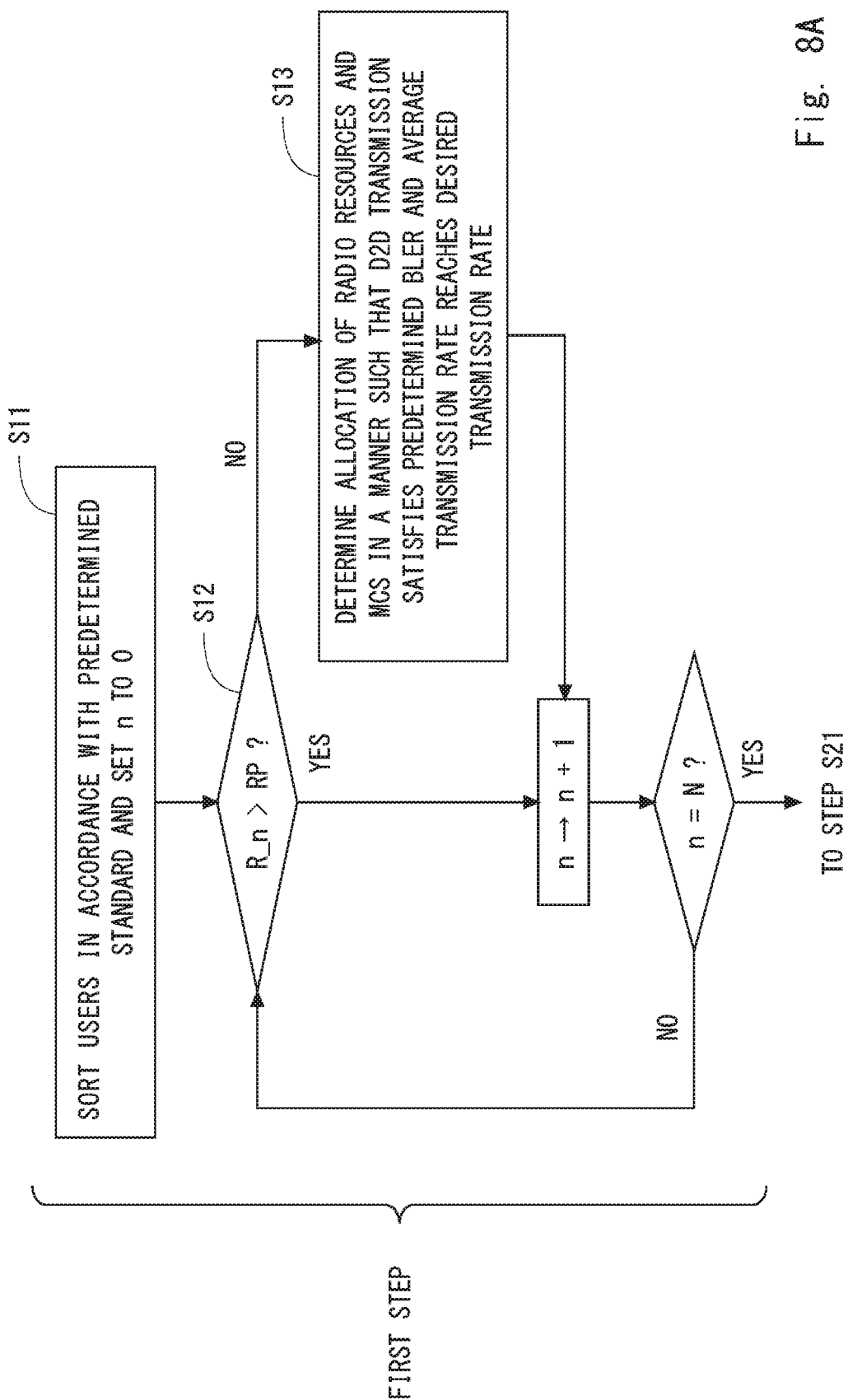
FIG. 8A is a flowchart illustrating an example of a resource allocation procedure.
Figure 8B:
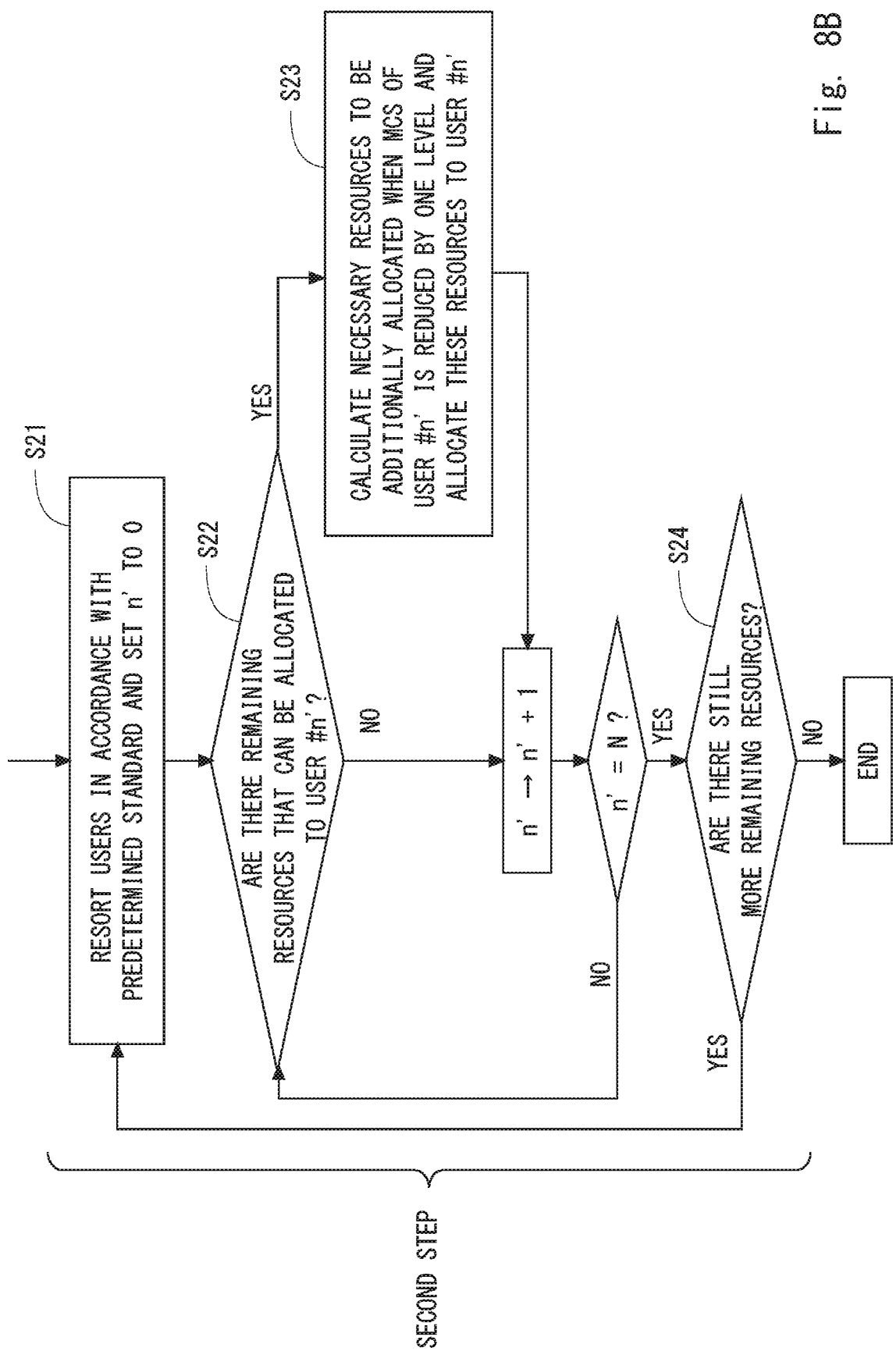
FIG. 8B is a flowchart illustrating an example of a resource allocation procedure.

FIGS. 8A and 8B illustrate a flowchart of an example of a resource allocation procedure according to the second embodiment. In the first step illustrated in FIG. 8A, the controller 12 allocates radio resources to each D2D transmission terminal and determines the MCS for each D2D transmission terminal in a manner such that each D2D transmission terminal (or D2D transmission, D2D pair) satisfies a predetermined BLER and an average transmission rate of each D2D transmission terminal reaches its desired transmission rate.

In step S11, the controller 12 of the base station 1 sorts a plurality of users (i.e., D2D transmission terminals or D2D pairs) in accordance with a predetermined standard. The predetermined standard used to sort the users may be, for example, the average transmission rates in a descending order, the average transmission rates in an ascending order, or the order of priority of the users.

In step S12, the controller 12 of the base station 1 determines whether the current average transmission rate of the user #n is no lower than a predetermined value. The predetermined value for the average transmission rate may be derived from past radio resource allocation. The controller 12 may generate an estimated value of average throughput by using a BLER set value used when radio resources have been allocated previously and may use the estimated value in place of the average transmission rate.

In step S13, the controller 12 of the base station 1 allocates radio resources to the user #n and determines the MCS (e.g., MCS index) for the user #n in a manner such that D2D transmission of the user #n satisfies a predetermined BLER and the average transmission rate of the user #n reaches a desired transmission rate. The predetermined BLER is an initial BLER value used in the first step. The predetermined BLER may be, for example, 10%, 1%, or 0.1%.

In the second step illustrated in FIG. 8B, the controller 12 of the base station 1 increases the amount of radio resource to be allocated to each user and sets the MCS for each user as low as possible under a condition that the transmission rates of the plurality of users satisfy their respective desired transmission rates.

In step S21, the controller 12 of the base station 1 sorts a plurality of users (i.e., D2D transmission terminals or D2D pairs) in accordance with a predetermined standard. The predetermined standard used to sort the users may be, for example, the average transmission rates in a descending order, the average transmission rates in an ascending order, or the order of priority of the users. The predetermined standard used in step S21 may differ from that used in step S11.

In step S22, the controller 12 of the base station 1 determines whether there are remaining resources that can be allocated to the user #n'. In one example of this determination method, the controller 12 determines whether there are remaining resources in a range where the resources allocated in step S13 can be extended. For example, when Single Carrier Frequency Division Multiple Access (SC-FDMA) is used in D2D communication, the RBs to be allocated to each user must be contiguous in the frequency direction. Meanwhile, the resources to be allocated to the user need not be contiguous in the time direction. In another example of the determination method, with the premise that resources are allocated to another user other than the user #n' in step S13, it is searched whether resources can be allocated to the user #n' in an amount that allows more bits to be transmitted than do the resources allocated to the user #n' in step S13.

In step S23, the controller 12 of the base station 1 calculates additional resources to be allocated that are necessary for achieving a desired transmission rate when the MCS (e.g., MCS index) of the user #n' is reduced by one level and allocates the additional resources to the user #n'. By reducing the MCS by one level at a time, the MCSs for respective users can be reduced by about the same amount. Thus, the BLERs for respective users can be reduced by about the same amount. In step S23, the MCS (e.g., MCS index) may be reduced by m (m is 2 or higher) levels. The size of the step by which the MCS is reduced (i.e., the value of m) may vary among the users.

In step S24, the controller 12 of the base station 1 determines whether there are still more remaining resources. If there are still more remaining resources, the controller of the base station repeats the operation in the second step. If there is no change in resource allocation in any of the users (i.e., if there is no remaining resource), the controller 12 of the base station 1 ends the processing illustrated in FIGS. 8A and 8B.

Third Embodiment

Spatial reuse of radio resources among D2D transmissions may be permitted. For example, in the first step illustrated in FIG. 8A, the controller 12 of the base station 1 may allocate different radio resources to a plurality of users. In contrast, in the second step illustrated in FIG. 8B, overlapping allocation of radio resources to a plurality of users may be permitted. For example, in the second step, the controller 12 of the base station 1 may permit overlapping allocation of radio resources to a plurality of users and, accordingly, may reallocate resources that have already been allocated to one of the users in the first step to another user (overlapping allocation). Overlapping allocation of radio resources to a plurality of users (i.e., a plurality of D2D pairs) can be carried out when it is determined that interference between these D2D pairs is low. If the interference between D2D pairs is lower than a predetermined level, the controller 12 of the base station 1 may allocate the same radio resources to these D2D pairs.

Other Embodiments

The resource allocation described in the foregoing embodiments may be applied to resource allocation for uplink communication and downlink communication between a base station and a terminal.

The processing of the controller 12 described in the foregoing embodiments may be implemented with the use of a semiconductor processing device, including an Application Specific Integrated Circuit (ASIC). Alternatively, the above processing may be implemented by causing a computer including at least one processor (e.g., microprocessor, central processing unit (CPU)), or micro processing unit (MPU)) to execute a program. Specifically, one or more programs may be supplied to a computer. These programs include a set of instructions (software codes) that, upon loaded into the computer, causes the computer to execute algorithms for the radio resource allocation described above.

These programs can be stored and provided to a computer by using various types of non-transitory computer-readable media. The non-transitory computer-readable media include various types of tangible storage media. Examples of the non-transitory computer-readable media include a magnetic storage medium (e.g., flexible disk, magnetic tape, hard disk drive), an optical magnetic storage medium (e.g., magneto-optical disk), Compact Disc Read-Only Memory (CD-ROM), CD-R, CD-R/W, and a semiconductor memory (e.g., mask ROM, Programmable ROM (PROM), Erasable PROM (EPROM), flash ROM, Random-Access Memory (RAM)). In addition, the program may be supplied to a computer in the form of various types of transitory computer-readable media. Examples of the transitory computer-readable media include an electric signal, an optical signal, and an electromagnetic wave. The transitory computer-readable media can provide the program to the computer via a wired communication line, such as an electric wire or an optical fiber, or via a wireless communication line.

Furthermore, the embodiments described above are merely examples pertaining to the applications of the technical ideas obtained by the present inventor. These technical ideas are not limited to the embodiments described above and various modifications can be made to these technical ideas.

For example, the whole or part of the foregoing embodiments can also be described as, but not limited to, the following supplementary notes.

(Supplementary Note 1)

A radio base station configured to receive from a radio terminal a connection request for bandwidth-guaranteed communication, wherein the radio base station is configured to allocate radio resources in a manner such that a bandwidth-guaranteed radio terminal uses a modulation and coding scheme (MCS) lower than that of a non-bandwidth-guaranteed radio terminal.

(Supplementary Note 2)

The radio base station according to Supplementary Note 1, wherein the radio base station is configured to reduce the MCS to be used by each radio terminal and accordingly increase an amount of radio resources to be allocated within a range that allows an average transmission rate or an estimated value of average throughput of each bandwidth-guaranteed radio terminal to achieve a desired transmission rate.

(Supplementary Note 3)

The radio base station according to Supplementary Note 2, wherein setting of the MCS includes sequentially carrying out, on a user-by-user basis, an operation of reducing the MCS by one level and accordingly increasing radio resources to be additionally allocated.

(Supplementary Note 4)

The radio base station according to Supplementary Note 2 or 3, wherein an increase in the amount of radio resources to be allocated is permitted only when it is possible to allocate radio resources equal to or greater than those to be additionally necessary for reducing the MCS by one or more levels.

(Supplementary Note 5)

The radio base station according to any one of Supplementary Notes 1 to 4, wherein allocation of the radio resources includes allocation of radio resources to D2D communication.

(Supplementary Note 6)

The radio base station according to any one of Supplementary Notes 1 to 4, wherein allocation of the radio resources includes allocation of radio resources to uplink or downlink communication between the radio base station and each terminal.

(Supplementary Note B1)

A radio base station comprising:

a transceiver configured to communicate wirelessly with a plurality of radio terminals; and a controller configured to allocate radio resources to the plurality of radio terminals, wherein the controller is configured to determine allocated radio resources and a Modulation and Coding Scheme (MCS) for each of a plurality of bandwidth-guaranteed radio terminals in a manner such that an amount of radio resources to be allocated to each bandwidth-guaranteed radio terminal is increased and the MCS to be set for each bandwidth-guaranteed radio terminal is reduced as far as possible within a range that allows a transmission rate of each bandwidth-guaranteed radio terminal obtained after the radio resources are allocated to the plurality of bandwidth-guaranteed radio terminals to achieve a desired transmission rate.

(Supplementary Note B2)

The radio base station according to Supplementary Note B2, wherein the controller is configured to reduce the MCS for each bandwidth-guaranteed radio terminal and accordingly increase the amount of radio resources to be allocated to the bandwidth-guaranteed radio terminal, within a range that allows an average transmission rate or an estimated value of average throughput of the bandwidth-guaranteed radio terminal to achieve the desired transmission rate.

(Supplementary Note B3)

The radio base station according to Supplementary Note B1 or B2, wherein the controller is configured to sequentially carry out, on a per-radio terminal basis, an operation including reducing the MCS for the radio terminal by one level and accordingly increasing radio resources to be additionally allocated.

(Supplementary Note B4)

The radio base station according to any one of Supplementary Notes B1 to B3, wherein the controller is configured to increase the amount of radio resources to be allocated to each radio terminal as long as additional radio resources necessary for achieving the transmission rate when the MCS for the radio terminal is reduced by one or more levels can be allocated to the radio terminal.

(Supplementary Note B5)

The radio base station according to any one of Supplementary Notes B1 to B4, wherein radio resource allocation carried out by the controller includes radio resource allocation to device-to-device (D2D) communication.

(Supplementary Note B6)

The radio base station according to any one of Supplementary Notes B1 to B4, wherein radio resource allocation carried out by the controller includes radio resource allocation to uplink or downlink communication between the radio base station and each radio terminal.

(Supplementary Note B7)

A method of allocating radio resources, the method comprising:

determining allocated radio resources and a Modulation and Coding Scheme (MCS) for each of a plurality of bandwidth-guaranteed radio terminals in a manner such that an amount of radio resources to be allocated to each bandwidth-guaranteed radio terminal is increased and an MCS to be set for each bandwidth-guaranteed radio terminal is reduced as far as possible within a range that allows a transmission rate of each bandwidth-guaranteed radio terminal obtained after the radio resources are allocated to the plurality of bandwidth-guaranteed radio terminals to achieve a desired transmission rate.

(Supplementary Note B8)

The method according to Supplementary Note B7, wherein the determining comprises reducing the MCS for each bandwidth-guaranteed radio terminal and accordingly increasing the amount of radio resources to be allocated to the bandwidth-guaranteed radio terminal, within a range that allows an average transmission rate or an estimated value of average throughput of the bandwidth-guaranteed radio terminal to achieve the desired transmission rate.

(Supplementary Note B9)

The method according to Supplementary Note B7 or B8, wherein the determining comprises sequentially carrying out, on a per-radio terminal basis, an operation including reducing the MCS for the radio terminal by one level and accordingly increasing radio resources to be additionally allocated.

(Supplementary Note B10)

The method according to any one of Supplementary Notes B7 to B9, wherein the determining comprises increasing the amount of radio resources to be allocated to each radio terminal as long as additional radio resources necessary for achieving the transmission rate when the MCS for the radio terminal is reduced by one or more levels can be allocated to the radio terminal.

(Supplementary Note B11)

The method according to any one of Supplementary Notes B7 to B10, wherein the radio resources are allocated to device-to-device (D2D) communication.

(Supplementary Note B12)

The method according to any one of Supplementary Notes B7 to B10, wherein the radio resources are allocated to uplink or downlink communication between a radio base station and each radio terminal.

(Supplementary Note B13)

A non-transitory computer-readable medium storing a program that causes a computer to perform a method of allocating radio resources, wherein the method comprises:

determining allocated radio resources and a Modulation and Coding Scheme (MCS) for each of a plurality of bandwidth-guaranteed radio terminals in a manner such that an amount of radio resources to be allocated to each bandwidth-guaranteed radio terminal is increased and the MCS to be set for each bandwidth-guaranteed radio terminal is reduced as far as possible within a range that allows a transmission rate of each bandwidth-guaranteed radio terminal obtained after the radio resources are allocated to the plurality of bandwidth-guaranteed radio terminals to achieve a desired transmission rate.

REFERENCE SIGNS LIST

1 BASE STATION
11 RADIO TRANSCEIVER
12 CONTROLLER

The invention claimed is:

1. A radio base station comprising:
a transceiver configured to communicate wirelessly with a plurality of radio terminals; and
a controller configured to:
determine radio resources to be allocated and a Modulation and Coding Scheme (MCS) to be set for each of a plurality of bandwidth-guaranteed radio terminals so as to minimize the MCS to be set for each bandwidth-guaranteed radio terminal by increasing an amount of radio resources to be allocated to each bandwidth-guaranteed radio terminal under a condition that transmission rates of the plurality of bandwidth-guaranteed radio terminals satisfy their respective desired transmission rates; and
allocate the determined radio resources and the determined MCS to each of the plurality of bandwidth-guaranteed radio terminals.

2. The radio base station according to claim 1, wherein the controller is configured to reduce the MCS for each bandwidth-guaranteed radio terminal and accordingly increase the amount of radio resources to be allocated to the bandwidth-guaranteed radio terminal, within a range that allows an average transmission rate or an estimated value of average throughput of the bandwidth-guaranteed radio terminal to achieve the desired transmission rate.

3. The radio base station according to claim 1, wherein the controller is configured to sequentially carry out, on a per-radio terminal basis, an operation including reducing the MCS for the radio terminal by one level and accordingly increasing radio resources to be additionally allocated.

4. The radio base station according to claim 1, wherein the controller is configured to increase the amount of radio resources to be allocated to each radio terminal as long as additional radio resources necessary for achieving the transmission rate when the MCS for the radio terminal is reduced by one or more levels can be allocated to the radio terminal.

5. The radio base station according to claim 1, wherein radio resource allocation carried out by the controller includes radio resource allocation to device-to-device (D2D) communication.

6. The radio base station according to claim 1, wherein radio resource allocation carried out by the controller includes radio resource allocation to uplink or downlink communication between the radio base station and each radio terminal.

7. A method of allocating radio resources, the method comprising:

determining radio resources to be allocated and a Modulation and Coding Scheme (MCS) to be set for each of a plurality of bandwidth-guaranteed radio terminals so as to minimize the MCS to be set for each bandwidth-guaranteed radio terminal by increasing an amount of radio resources to be allocated to each bandwidth-guaranteed radio terminal under a condition that transmission rates of the plurality of bandwidth-guaranteed radio terminals satisfy their respective desired transmission rates; and allocating the determined radio resources and the determined MCS to each of the plurality of bandwidth-guaranteed radio terminals.

8. The method according to claim 7, wherein the determining comprises reducing the MCS for each bandwidth-guaranteed radio terminal and accordingly increasing the amount of radio resources to be allocated to the bandwidth-guaranteed radio terminal, within a range that allows an average transmission rate or an estimated value of average throughput of the bandwidth-guaranteed radio terminal to achieve the desired transmission rate.

9. The method according to claim 7, wherein the determining comprises sequentially carrying out, on a per-radio terminal basis, an operation including reducing the MCS for the radio terminal by one level and accordingly increasing radio resources to be additionally allocated.

10. The method according to claim 7, wherein the determining comprises increasing the amount of radio resources to be allocated to each radio terminal as long as additional radio resources necessary for achieving the transmission rate when the MCS for the radio terminal is reduced by one or more levels can be allocated to the radio terminal.

11. The method according to claim 7, wherein the radio resources are allocated to device-to-device (D2D) communication.

12. The method according to claim 7, wherein the radio resources are allocated to uplink or downlink communication between a radio base station and each radio terminal.

13. A non-transitory computer-readable medium storing a program that causes a computer to perform a method of allocating radio resources, wherein the method comprises:

determining radio resources to be allocated and a Modulation and Coding Scheme (MCS) to be set for each of a plurality of bandwidth-guaranteed radio terminals so as to minimize the MCS to be set for each bandwidth-guaranteed radio terminal by increasing an amount of radio resources to be allocated to each bandwidth-guaranteed radio terminal under a condition that transmission rates of the plurality of bandwidth-guaranteed radio terminals satisfy their respective desired transmission rates; and allocating the determined radio resources and the determined MCS to each of the plurality of bandwidth-guaranteed radio terminals.

* * * * *